(12) United States Patent
Sebastian et al.

(10) Patent No.: US 7,673,074 B1
(45) Date of Patent: Mar. 2, 2010

(54) AVOIDING PORT COLLISIONS IN HARDWARE-ACCELERATED NETWORK PROTOCOL

(75) Inventors: Bino J. Sebastian, Marlboro, MA (US); James B. Williams, Lowell, MA (US); Harold E. Roman, Acton, MA (US); Richard F. Prohaska, Westford, MA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 1532 days.

(21) Appl. No.: 10/421,495

(22) Filed: Apr. 22, 2003

Related U.S. Application Data (60) Provisional application No. 60/421,307, filed on Oct. 24, 2002.

(51) Int. Cl.
*G06F 15/16* (2006.01)
*G06F 15/173* (2006.01)
*G06F 15/177* (2006.01)

(52) U.S. Cl. .................. 709/250; 709/230; 370/401

(58) Field of Classification Search ......... 709/246–251, 709/217–230, 200–203; 370/401, 469, 392
See application file for complete search history.

(56) References Cited

U.S. PATENT DOCUMENTS

| | | | |
|---|---|---|---|
| 6,324,583 B1 * | 11/2001 | Stevens ...................... | 709/230 |
| 6,694,361 B1 * | 2/2004 | Shah et al. .................. | 709/222 |
| 7,149,819 B2 * | 12/2006 | Pettey ......................... | 709/250 |
| 2003/0014544 A1 * | 1/2003 | Pettey ......................... | 709/249 |
| 2003/0202536 A1 * | 10/2003 | Foster et al. ................ | 370/469 |
| 2004/0037299 A1 * | 2/2004 | Pandya ....................... | 370/401 |
| 2004/0049591 A1 * | 3/2004 | Fan et al. .................... | 709/230 |
| 2004/0062245 A1 * | 4/2004 | Sharp et al. ................. | 370/392 |
| 2004/0083308 A1 * | 4/2004 | Sebastian et al. ............ | 709/248 |
| 2004/0111523 A1 * | 6/2004 | Hall et al. ................... | 709/230 |
| 2004/0128398 A1 * | 7/2004 | Pettey ......................... | 709/249 |
| 2006/0069719 A1 * | 3/2006 | McCanne et al. ........... | 709/203 |

OTHER PUBLICATIONS

"Intel Virtual Interface (VI) Architecture Developer's Guide," Revision 1.0, Sep. 9, 1998; © Intel Corporation 1998; pp. 1-94.

"Virtual Interface Architecture Specification," Version 1.0, Dec. 16, 1997, © 1997 Compaq Computer Corp., Intel Corporation, Microsoft Corporation; pp. 1-83.

Technology Brief, Virtual Interface Architecture for System Area Networks, Fourth Edition (Jun. 1999) 0184-0699-A, Compaq Computer Corporation, Prepared by ISSD Technology Communications, TechCom@compaq.com, pp. 1-14.

(Continued)

*Primary Examiner*—Haresh N Patel
(74) *Attorney, Agent, or Firm*—Morrison & Foerster LLP (57) ABSTRACT

The avoidance of port collisions in a hardware-accelerated network protocol, such as Transmission Control Protocol (TCP)/Internet Protocol (IP), is disclosed. In one example, a hardware-accelerated host bus adaptor (HBA) offloads protocol processing from a host computer's operating system. However, a port collision occurs if a non-accelerated host TCP/IP stack and a hardware accelerated host bus adapter TCP/IP stack choose the same port for establishing a network connection. In a double-ended TCP/IP acceleration connection, a unique TCP port is bound to the accelerated TCP/IP stack. In a single-ended TCP/IP acceleration connection, either the host TCP/IP stack is prevented from using that port or a non-accelerated connection is associated with an accelerated connection without binding a port.

18 Claims, 6 Drawing Sheets

OTHER PUBLICATIONS

"VI/TCP (Internet VI)," Network Working Group, Internet-Draft, Expires Jan. 2001; by S. DiCecco, J. Williams, GigaNet, Inc., Jul. 14, 2000, Internet Engineering Task Force (IEFT), http://www.ietf.org/lid-abstracts.txt, pp. 1-19.

"VIDF Virtual Interface (VI) Architecture Developer's Guide," Revision 1.1 Draft; Sep. 26, 2000; © Intel Corporation 1998, 1999, 2000; pp. 1-99.

* cited by examiner

AVOIDING PORT COLLISIONS IN HARDWARE-ACCELERATED NETWORK PROTOCOL

CLAIM OF PRIORITY

The present application claims priority to co-assigned U.S. Provisional Patent Application No. 60/421,307, entitled "TCP PORT COLLISION AVOIDANCE IN HARDWARE ACCELERATED TCP/IP," filed on Oct. 24, 2002, which is hereby incorporated by reference.

BACKGROUND

Transmission Control Protocol (TCP)/Internet Protocol (IP) is a set of networking protocols that provide communication across interconnected networks, between computers with diverse hardware architectures and various operating systems. The TCP/IP protocols track Internet Protocol addresses of nodes, routes outgoing messages and recognizes incoming messages. TCP is a connection-oriented, end-to-end transport layer protocol used to transfer data in a network. Internet Protocol addresses packets and is the messenger protocol of the TCP/IP protocols.

A conventional network interface card (NIC) receives TCP/IP packets from a network and buffers the packets in a network interface card memory before transferring to a host operating system memory. A conventional host operating system (OS) copies packets from the host OS memory to application memory. The network interface card may also transfer TCP/IP packets from the host OS to the network.

A kernel of a conventional host operating system may have a TCP/IP stack that handles transport protocol processing of TCP/IP packets. The host TCP/IP stack may use TCP and Internet Protocol headers to determine a "connection" to which a packet is associated. An Internet Protocol header may include a source Internet Protocol address and a destination Internet Protocol address. A TCP header may include a source port ID/number, a destination port ID/number, a checksum, a packet sequence number and other control information. If the TCP/IP packets are received from the network out of order, the host operating system may use TCP packet sequence numbers in TCP headers to put the TCP/IP packets in a proper order. The host operating system may also reassemble data (messages) that the NIC receives in pieces.

Popular legacy communication libraries and technologies, such as sockets on TCP/IP Ethernet, rely on the host processor to process communication protocols. As processors and networks become faster, host computer systems spend more time running communication protocols, which leaves less time for application processing. As the host processor becomes overtaxed by the communications protocol processing overhead, the processor has less time to execute applications. The network may be underutilized, and network potential may remain unrealized.

The present application may refer to the following documents: "Virtual Interface Architecture Specification," Version 1.0, Dec. 16, 1997 from Compaq, Intel and Microsoft (hereinafter "VIAR"); "Intel Virtual Interface (VI) Architecture Developer's Guide," September, 1998 from Intel (hereinafter "VIDG"); "VIDF Virtual Interface (VI) Architecture Developer's Guide," Revision 1.1 Draft, Sep. 26, 2000 from Intel; and a "VI/TCP (Internet VI)" memo published by Jim Williams, a named inventor of the present application, and S. DiCecco, for the Network Working Group of the Internet Engineering Task Force (IETF), on Jul. 14, 2000 (hereinafter "IETF Memo").

SUMMARY

A hardware-accelerated Transmission Control Protocol (TCP)/Internet Protocol (IP) system may provide a traditional non-accelerated TCP/IP network interface through a network driver and an accelerated TCP/IP interface through a TCP/IP acceleration driver. TCP/IP acceleration hardware may be configured by changing configuration definitions in a file or fixed memory location.

The present application describes systems and methods of avoiding port collisions in a hardware-accelerated network protocol, such as TCP/IP. The methods may help implement Virtual Interface (VI) over TCP/IP. The methods may be implemented in a hardware-accelerated host bus adapter (HBA), a network interface card (NIC) or a Network File System (NFS) acceleration device. Network File System is a protocol that may be layered on top of TCP.

The systems and methods may advantageously offload protocol processing from the host operating system, which frees up more host CPU cycles for application processing. Another advantage may be accelerated connections that provide higher data throughput for a host computer. A server computer may achieve a 10-Gigabit or higher connection with acceleration methods described herein. Another advantage may be no hardware changes needed for the host computer. Another advantage may be accommodating both host applications configured for accelerated connections and host applications (legacy applications) not configured for accelerated connections.

One aspect relates to a method comprising: reserving a local port number in a first protocol processing stack in a host operating system; preventing the first protocol processing stack in the host operating system from establishing a network connection using the reserved local port number; and using the reserved local port number for an accelerated network connection.

Another aspect relates to a method comprising: receiving a request to establish a connection between a first application at a local device and a second application at a remote device, the connection using an accelerated interface; selecting a port number as a local port number for the connection; and using a reserved port number at the remote device as a destination port number for the connection.

Another aspect relates to a system comprising a network and a plurality of servers. Each server comprises a host operating system executing a first protocol processing stack and a host bus adapter executing a second protocol processing stack. The first protocol processing stack is adapted to establish connections with a plurality of local port numbers except a reserved local port number. The host bus adapter is coupled to the network. The second protocol processing stack is adapted to use the reserved local port number.

Details of one or more implementations are set forth in the accompanying drawings and the description below. Other features and advantages may be apparent from the description and drawings, and from the claims.

DETAILED DESCRIPTION

Figure 1:
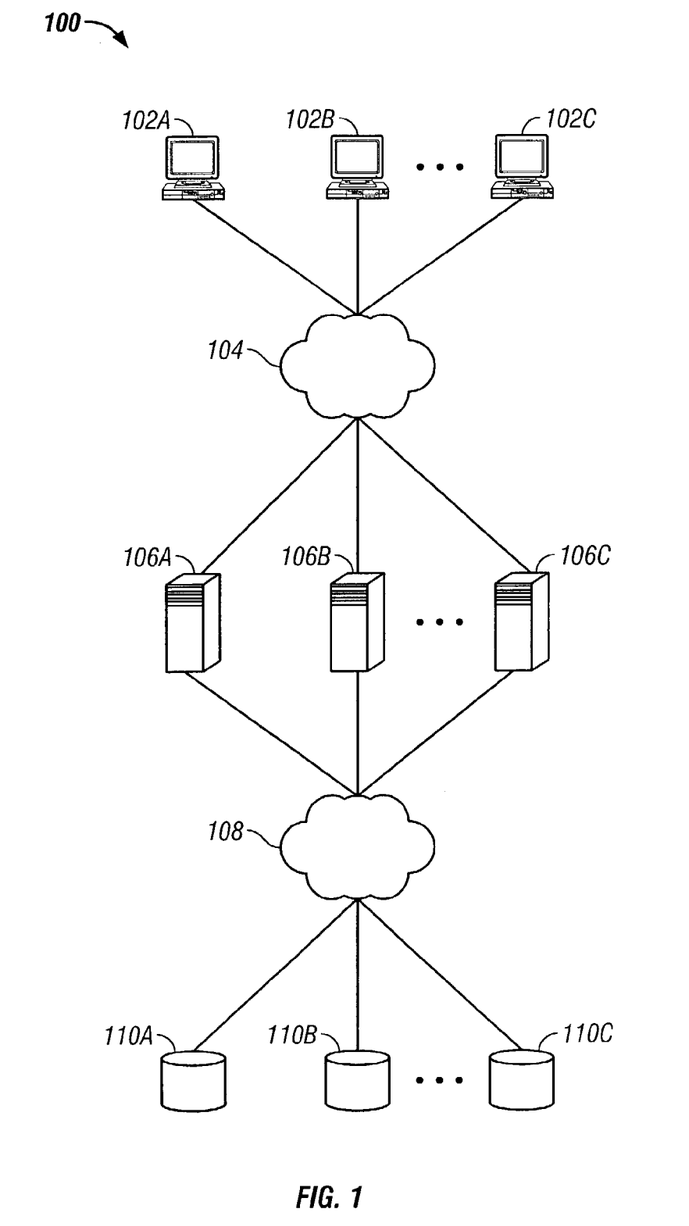
FIG. 1 illustrates a system of user or client computers, a communication network, servers, another communication network, and storage devices.

FIG. 1 illustrates a system 100 of user or client computers 102A-102C, a communication network 104, servers 106A-106C, another communication network 108, and storage devices 110A-110C.

The network 104 may include an Ethernet network, an Internet Protocol network and/or an ATM (Asynchronous Transfer Mode) network. The network 104 may be a private network, a virtual private network, an enterprise network, a public network and/or the Internet. The network 104 provides a communication link between multiple user or client computers 102A-102C and servers 106A-106C.

Each server 106 may be, for example, an Intel®-based system, such as an Intel® AC450NX System with four 550-MHz Pentium® III Xeon™ processors and 1 GB (Gigabyte) RAM, or an Intel® OCPRF100 System with eight 550-MHz Pentium® III Xeon™ processors and 1 GB RAM.

The multiple storage devices 110A-110C and the network 108 may be referred to as a storage area network (SAN). The network 108 may be a high-speed network dedicated to data storage, such as an Internet Protocol network using Gigabit Ethernet transport, or a Fibre Channel network, such as a Fibre Channel Arbitrated Loop or a Fibre Channel Switched Fabric. The network 108 may provide the servers 106A-106C with block-level input/output access to the shared storage devices 110A-110C.

Each storage device 110 may be a storage array using Small Computer System Interface (SCSI), Peripheral Component Interconnect (PCI), PCI-X or other bus architecture, Just a Bunch of Disks (JBOD), a Redundant Array of Inexpensive Disks (RAID) enclosure, or other storage device.

Figure 2:
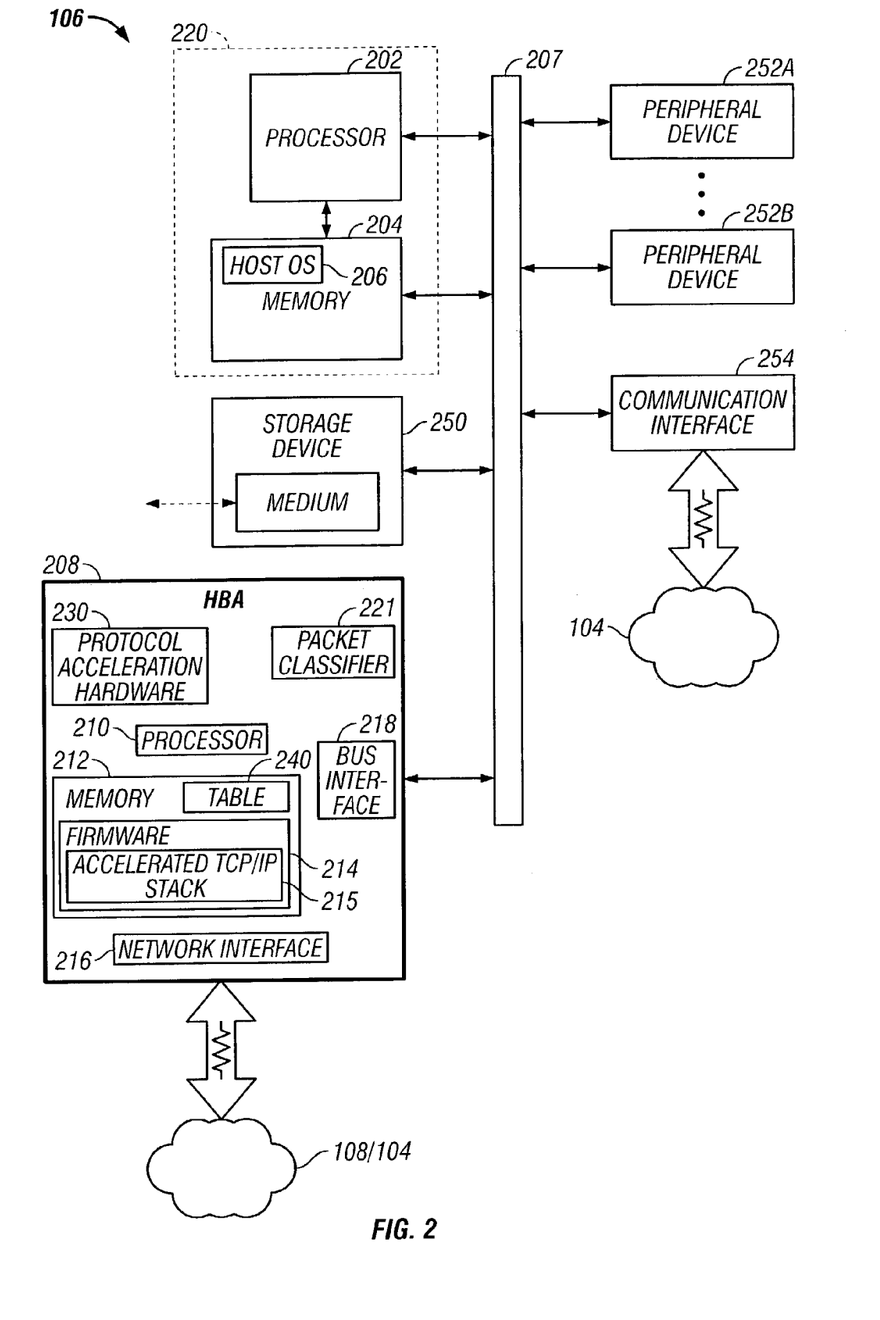
FIG. 2 illustrates an example of a server in FIG. 1.

FIG. 2 illustrates an example of a server 106 in FIG. 1, which includes a host processor 202, a host memory 204 with software, such as a host operating system (OS) 206, a component interconnect or local bus 207 and a host bus adapter (HBA) or network interface card (NIC) 208. The host processor 202, host memory 204, and host operating system 206 may collectively be called a "host" 220. The server 106 may also include a storage device 250, peripheral devices 252A, 252B, and a communication interface 254. The bus 207 may be a Peripheral Component Interconnect (PCI), a PCI-Extended (PCI-X), an industry standard architecture (ISA), an extended ISA (EISA), an Accelerated Graphics Port (AGP), a Universal Serial Bus (USB), or a Small Computer System Interface (SCSI) bus.

The host memory 204 may include a non-volatile memory and a volatile memory. For example, a non-volatile memory may be used to store system firmware, which can be used to handle initialization of the server system 106 and loading of the operating system (OS) 206. The host operating system 106 may be based on Windows® 2000, provided by Microsoft Corporation, located at One Microsoft Way Redmond Wash. 98052-6399, Solaris® 8, provided by Sun Microsystems, Inc., located at 901 San Antonio Road Palo Alto Calif. 94303, or Linux, a freely-distributable open source implementation of UNIX.

The host bus adapter 208 in FIG. 2 provides an interface between the host 220 and a communication network 104 or 108 in FIG. 1, which provides block-level Input/Output (I/O) services or file system level Input/Output (I/O) services. The host bus adapter 208 may be inserted into an existing server system 106.

The host bus adapter 208 may include a processor 210, a memory 212, firmware 214, a network interface 216 to the communication network 104 or 108, a bus interface 218 to the host 220, a packet classifier 221, and network protocol (e.g., TCP/IP) acceleration hardware 230. The memory 212 may include a non-volatile memory and a volatile memory. The memory 212 may include an electrical-erasable programmable read-only memory (EEPROM), a synchronous dynamic random access memory (SDRAM) and/or a flash memory. The memory 212 may store firmware 214, such as an accelerated protocol (e.g., TCP/IP) processing stack 215.

Figure 3:
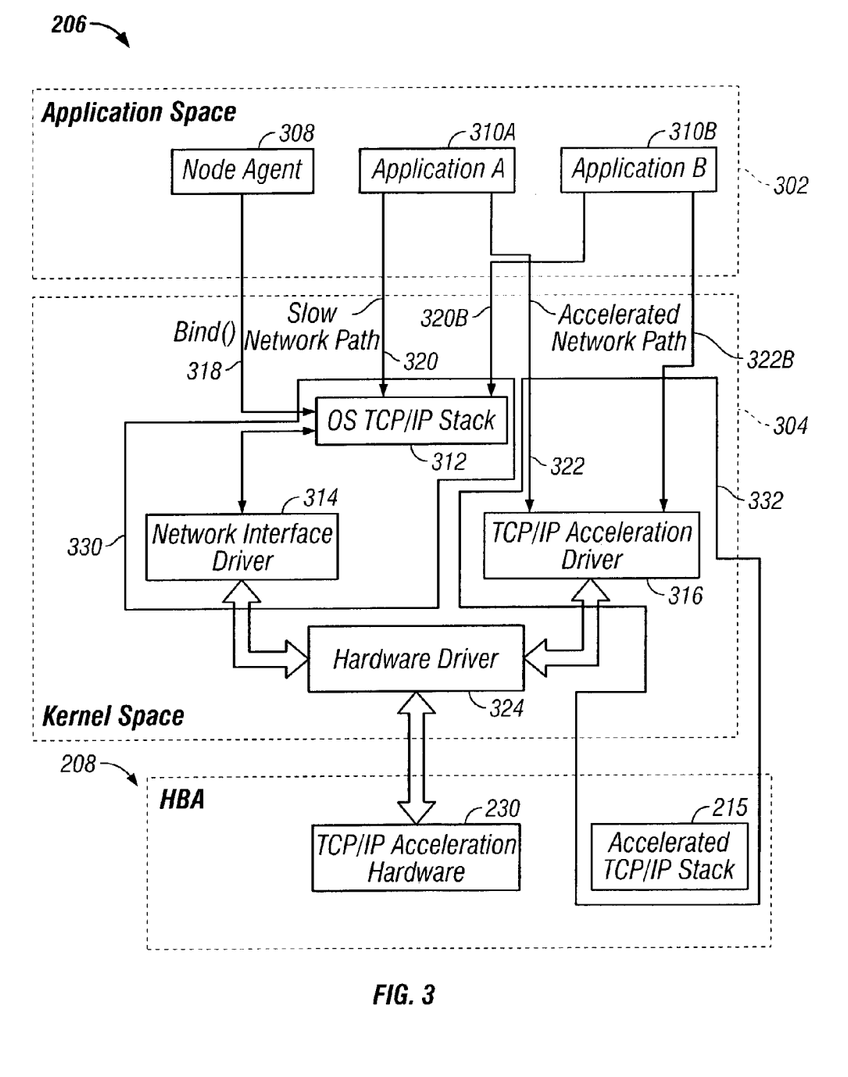
FIG. 3 is another view of a host operating system (OS) and host bus adapter in FIG. 2.

Some of the components of the host bus adapter 208 shown in FIG. 3 may overlap. For example, the protocol "acceleration hardware" 230 may include the processor 210, the accelerated TCP/IP stack 215 and the packet classifier 221. The acceleration hardware 230 may include firmware code running on hardware, such as an Intel processor (e.g., Intel 80200 processor) and an input/output (I/O) companion chip (e.g., Intel 80312 chip). There may be a non-volatile memory, which stores firmware related to acceleration, and a non-volatile HBA memory which temporarily stores firmware related to acceleration.

The host bus adapter 208 may be made to support multiple operating system/platforms. The system-interconnect bus interface 218 may be configured to connect with a parallel bus, such as a PCI or PCI-X bus. The network interface 216 may be configured to connect with a defined network, such as a Fibre Channel network or a Gigabit Ethernet network. The network interface 216 may include an Intel Gigabit Ethernet Controller (e.g., 82543GC) and a fiber optic transceiver for Gigabit Ethernet.

The host bus adapter 208 may provide I/O processing and physical connectivity between the server system 106 and another system, such as another server 106B or storage device 110 in FIG. 1. A storage device 110 may be attached using a variety of direct attached or storage networking technologies, such as Fibre Channel, Small Computer System Interface (SCSI), Small Computer System Interface over Internet Protocol (iSCSI), VI/IP or FICON (Fiber Connection). The host bus adapter 208 may take block-level data from the parallel I/O bus 207 (e.g., PCI-X) and map the data to a routable protocol (e.g., TCP/IP over Ethernet) for transport.

The host bus adapter 208 may provide a direct path between a VI-enabled application 310A (FIG. 3) and the network 104 or 108, which may bypass compute-intensive host operating system protocol processing routines.

FIG. 3 is another view of the host operating system (OS) 206 and the host bus adapter 208 in FIG. 2. The host operating system 206 includes an application space 302 and a kernel space 304. The modules in the application space 302 and kernel space 304 may be software or firmware executed by hardware, such as the host processor 202 in FIG. 2. The application space 302 includes a node agent 308 and one or more host applications 310A, 310B. Each application 310 may act as a "client" or "user" application. A Network File Server (NFS) may be an example of an application 310A. For example, the application 310A may be a database application trying to access a database server through an accelerated TCP/IP interface. This may be a kernel space application like a NFS client. The node agent 308 may be in application space 302 or in kernel space 304.

The kernel space 304 includes a host operating system protocol (e.g., TCP/IP) processing stack 312, a network interface driver 314, a TCP/IP acceleration driver 316 and a device or hardware driver 324. The kernel space 304 may also include a NFS module (not shown). The host operating system protocol processing stack 312 may process TCP/IP packets and perform standard TCP/IP functions. For example, the host operating system protocol processing stack 312 may assemble data from an application 310A into TCP packets, track a sequence number of each packet and rearrange packets that have been received out of order.

Accelerated and Non-Accelerated Interfaces

There are two "paths" 320, 322 associated with two network "interfaces" 330, 332 between a host application 310A and the host bus adapter TCP/IP acceleration hardware 230 in FIG. 3. A standard non-accelerated or "slow" network interface 330 includes a slow network path 320, the operating system TCP/IP network stack 312 and the network interface driver 314. The network TCP/IP stack 312 of the standard network interface 330 may be processed in the kernel 304 of the host operating system 206.

An "accelerated" network interface 332 includes an accelerated network path 322, the TCP/IP acceleration driver 316 and the host bus adapter accelerated TCP/IP processing stack 215. A portion of the network processing stack for the accelerated network interface 332 is performed by the accelerated TCP/IP processing stack 215 in the host bus adapter 208. For example, there may be a 10x performance/throughput difference between data transferred via the non-accelerated and accelerated interfaces 330, 332.

The application 310A has two paths 320, 322 for sending packets to the host bus adapter 208. The host application space 302 may have multiple applications 310A, 310B, and each application 310 may have at least two paths 320, 320B, 322, 322B for sending packets to the host bus adapter 208. There may be applications which use only a slow path 320 or an accelerated path 322 or both.

A host application 310A, such as a database application, may simultaneously use both non-accelerated and accelerated interfaces 330, 332. An application 310A may use the non-accelerated interface 330 for less critical or non-critical performance modules/functions of the application 310A and use the accelerated interface 332 for critical performance modules/functions. Some functions of an application 310 may have a higher priority or a more urgent need to communicate data than other functions. The two paths 320, 322 will help fast deployment of applications 310A, 310B for the accelerated interface 332.

Alternatively, an application 310A may use the non-accelerated interface 330, and another application 310B may simultaneously use the accelerated interface 332. Some applications (e.g., legacy applications) may only use the non-accelerated interface 330 because these applications are not configured to use the accelerated interface 332. Certain portions of some existing legacy applications may be modified to use the accelerated interface 332.

The hardware device driver 324 may drive the host bus adapter 208. The host bus adapter 208 may handle data from both slow and accelerated network interfaces 330, 332. The host bus adapter 208 may be any network device that handles at least partial network processing stack offload 215 from the host 220. The host bus adapter 208 need not have a completely separate and independent protocol (TCP/IP) stack (e.g., the host bus adapter protocol stack 215 need not have its own Internet Protocol address). Instead of a host bus adapter 208, the hardware driver 324 may drive a network interface card (NIC), a network file system (NFS) accelerator product, a remote direct memory access (RDMA) bufferless NIC, or a TCP offload engine.

Connection

Software applications run by end devices (servers 106A-106C) send data packets to each other via "connections." Each TCP "connection" established in a TCP/IP network, such as the network 108 in FIG. 2, should have a unique number that includes <local_IPaddr, remote_IPaddr, local_TCP_port, remote_TCP_port>. Each TCP connection may be uniquely identified by these four fields. If a field changes, then the four fields refer to a different connection. Although TCP is described here, other protocols with port numbers may be used with Internet Protocol addresses. The local_IPaddr identifies a local device (e.g., server 106A in FIG. 1), and the local_TCP_port identifies a connection end point (e.g., a host application 310A in FIG. 3). The remote_IPaddr identifies a remote device (e.g., server 106B), and remote_TCP_port identifies another connection end point (e.g., an application running on the server 106B).

A device, such as a server 106A, may have a unique local Internet Protocol address and multiple port numbers, which allow the device to simultaneously maintain a plurality of active connections with other devices. Each of the active connections may have its own local port number.

Each TCP packet may include a header with a source Internet Protocol address, a destination Internet Protocol address, a source port number and a destination port number (collectively called a "four-tuple"). The source Internet Protocol address and source port number identify a source device (e.g., server 106A) and a connection end point (e.g., an application 310) that sent the packet. The destination Internet Protocol address and destination port number identify a destination device (e.g., server 106B) and connection end point (e.g., an application) that should receive the packet.

The standard network interface 330 and accelerated TCP/IP interface 332 in FIG. 3 may use the same Internet Protocol address, i.e., the standard network TCP/IP stack 312 and the accelerated TCP/IP stack 215 may have the same assigned Internet Protocol address. One or more connections may be established through the slow host TCP/IP stack 312, and one or more connections may be established through the hardware-accelerated TCP/IP stack 215 in the host bus adapter 208.

Possible Collisions

The host TCP/IP stack 312 and the hardware-accelerated host bus adapter TCP/IP stack 215 may have the same assigned Internet Protocol address, but a collision may occur if they use the same local port number. The non-accelerated host TCP/IP stack 312 may choose a local TCP port number for connections established through the host TCP/IP stack 312. The host bus adapter's hardware-accelerated TCP/IP stack 215 may choose a local TCP port number for connections established through the host bus adapter hardware-accelerated TCP/IP stack 215. This may cause a collision in a TCP port if the local port numbers of the connections are the same, i.e., not synchronized. A collision causes packets to be dropped or delivered to the wrong destination. The host non-accelerated host TCP/IP stack 312 may not be aware of the host bus adapter's accelerated TCP/IP stack 215.

Multiple host applications 310A, 310B may use different local port numbers. Another type of collision is if two host applications 310A, 310B in the application space 302 try to use the same local port number of the host bus adapter 208.

A method of avoiding TCP port collisions is to use one Internet Protocol address for the host's non-accelerated operating system TCP/IP stack 312 and another Internet Protocol address for the host bus adapter's accelerated TCP/IP stack 215. But some security features on the network 108 may require host applications 310A, 310B to use the same Internet Protocol address on accelerated and non-accelerated paths 322, 320. An example of a security feature may be an authentication scheme which uses source or destination IP address for authentication and security. In addition, using the same Internet Protocol address on accelerated and slow paths 322, 320 will allow a host application 310A to use the slow TCP path 320 for non-critical performance modules/functions of the application 310A and use the accelerated path 322 for more critical performance modules/functions.

Multiple network addresses ("network addresses" are the same as "IP addresses" for a TCP/IP network) for the same network interface (which actually includes two interfaces 330, 332) may make management of the network 108 difficult.

Client and Server

The application 310A in FIG. 3 may act as a "client" or as a "server" of a "double-ended" TCP/IP acceleration system. For example, the application 310A may act as a "client" at server device 106A (FIG. 1) and request a connection with a "server" application at server device 106B. The "server" application may complete the requested connection from the "client." The "client" and "server" labels may be arbitrary after a connection is established because then either application can initiate data transfers. The components in FIG. 3 may be referred to herein as a "client end" or a "server end." The components in FIG. 3 may be in each server 106 in FIG. 1.

Double-Ended TCP/IP Acceleration

A "double-ended" TCP/IP acceleration system uses TCP/IP acceleration hardware on both client and server ends of a connection, or at least both ends recognize acceleration protocols. In a "double-ended" TCP/IP acceleration system, the host's non-accelerated stack 312 and host bus adapter accelerated stack 215 in FIG. 3 use the same Internet Protocol address. In the double-ended TCP/IP acceleration system, hardware on each end (each server device 106 in FIG. 1) may have a dedicated/reserved unique, "well-known" local TCP port number (e.g., 0x333) because each end may act as a "server." Each end acting as a "server" end should have an IP address and local TCP port number that is known to each "client" application, which may try to establish a connection with the "server" end Only a "server" end of a connection uses this dedicated "well-known" port number. A "client" end may use an arbitrarily chosen port number, as described below.

Double-ended TCP/IP acceleration may be used in implementing a Virtual Interface (VI) over Internet Protocol (VI/IP). The collision problem described above may be solved in VI/IP by using the following method.

Binding a Local Port Number for a "Server" to Use

In general, both stacks 312 and 215 may know that a unique local TCP port number (e.g., 0x333) is bound/reserved. The HBA accelerated TCP/IP stack 215 knows the unique local TCP port number is bound for the accelerated TCP/IP stack 215 to establish an accelerated connection for an application acting as a "server." The host TCP/IP stack 312 may know that the unique local TCP port number is bound/reserved but may not know for what purpose. There may be more than one method of reserving the port number and more than one method of notifying the stacks 312 and 215.

There may be three ways that the node agent 308 may bind a port number for the accelerated HBA stack 215. The node agent 308 may be self-motivated, bind a port number without instructions from a HBA 208, and then try to find a HBA 208 to assign the port number. For example, when the host operating system 206 is initialized, the node agent 308 may program/bind/reserve a local port number (e.g., 0x333). The binding is shown on path 318 from the node agent 308 to the host operating system TCP/IP stack 312.

Alternatively, the node agent 308 may look for an HBA 208, then grab the port number and hand the port number to the HBA 208. Alternatively, the node agent 308 may passively wait for a request from an HBA 208 and then only when requested by the HBA 208, grab a port number. This is may be an ease-of-implementation issue. It may be easier to implement a node agent 308 that is self-motivated, binds a port number without instructions from a HBA 208, and then try to find a HBA 208 to assign the port number.

The node agent 308 may bind a local port number dynamically or non-dynamically, i.e., a fixed port number, for the HBA's accelerated TCP/IP stack 215 to use. The binding 318 from the node agent 308 prevents the host TCP/IP stack 312 from opening/establishing/setting up a non-accelerated connection with the bound local port number, which is reserved for the host bus adapter accelerated TCP/IP stack 215.

As described above, the node agent 308 binds only one well-known reserved port number for a "server" end of a double-ended TCP/IP acceleration connection. The node agent 308, however, may bind ports for other acceleration services, i.e., an additional acceleration path that parallels the standard TCP/IP stack. There may be multiple acceleration protocol services running, such as VI/IP, iSCSI, and NFS-accelerator.

The node agent 308 instructs or informs the host bus adapter accelerated TCP/IP stack 215 of the designated local port number that may be used by an application 310A acting as a "server" for an accelerated connection. The reserved port number may be compiled into the host bus adapter firmware 214, such as the accelerated TCP/IP stack 215. The host bus adapter's accelerated TCP/IP stack 215, the TCP/IP acceleration hardware 230 and the TCP/IP acceleration driver 316 may use the reserved port number (e.g., 0x333) for one or more accelerated connections. The reserved local port number keeps one or more accelerated connections separate from non-accelerated connections. This ensures that packets associated with non-accelerated connections go to the host TCP/IP stack 312 and packets associated with an accelerated connection go to the host bus adapter TCP/IP stack 215.

The host bus adapter firmware 214 adds a new port number to a table 240 of port numbers, which is accessible by the packet classifier 221 described below. The table 240 may be stored in the host bus adapter memory 212. In this example, there is only one well-known local port number, and the node agent 308 binds only that port number.

Multiple applications 310A, 310B may act as "servers" in multiple accelerated connections with one reserved port number. Multiple accelerated connections are distinguished and kept separate because each connection is identified by a local IP address, local port number, remote IP address and remote port number.

Client Establishing a Connection

If the application 310A acts as a "client," it sends a request to establish a non-accelerated connection to the host TCP/IP stack 312 or sends a request to establish an accelerated connection to the host bus adapter accelerated stack 215. For an accelerated connection request, the "client" application 310A may only need to send the intended destination IP address to the HBA accelerated stack 215.

The HBA accelerated stack 215 may know or determine the source IP address, source port number and destination port number. The HBA accelerated stack 215 knows its own source IP address, and chooses a local source port number (e.g., between 1024 to 64*1024 or 64 k) that is not being used with the destination IP address/port number address. The HBA accelerated stack 215 at the "client" end may arbitrarily select a local port number, except the "client" end may not reuse the same port number when the "client" end establishes a second connection to the same "server" end. Two clients at the same client end may not use the same local port number. Once a port number is picked for a client, the port number is marked as used.

For example, two "client" applications M and N (e.g., applications 310A, 310B in FIG. 3) at device A (e.g., server device 106A in FIG. 1) may both want to establish accelerated connections with "server" applications O and P at device B (e.g., server device 106B in FIG. 1). On behalf of clients M and N, the HBA stack 215 at device A picks different local source port numbers, e.g., 1024 and 1025, for two different connections to device B. The client application M may re-use the same local port number 1024 to establish a connection to a third server (e.g., server device 106C in FIG. 1).

The destination port number of the two connections will be the well-known bound port number at the "server" end. The "server" applications O and P at device B use the same local port number (e.g., 0x333) for the two connections. The server side port number is the well-known port number bound by the node agent 308. The node agent 308 reserves only one well-known local port number as the "server" end for accelerated connections. Each "server" application may listen to the well-known reserved port number for an accelerated connection request. The two accelerated connections between devices A and B is distinguished by the difference in the client side port numbers (e.g., 1024 and 1025).

The connection identifier <client IP address, client port, server IP address, server port> for these connections would be for Client M:

<IP address of device A, 1024, IP address of device B, 0x333>;

for Client N:

<IP address of device A, 1025, IP address of device B, 0x333>

These two connection identifiers differ only in local port number. Multiple client applications and multiple server applications may coexist on the same server 106 in FIG. 1.

The connection setup for clients and servers are different in the firmware TCP/IP stacks 215 at the devices A and B. But after the connection is established, clients and servers behave similarly for data transfers.

Only the "server" end port number needs to be reserved, and only one reserved port number may be needed. If the "server" is fast, the "server" may have connections with thousands of "clients" simultaneously. The "clients" may have unique IP address and port number combinations all connected to a single "server" with a single IP address and port number combination.

Packet Classifier

The packet classifier 221 (FIG. 2) in the host bus adapter 208 examines the destination port number and source port number of each incoming/received packet from the network 108. The packet classifier 221 accesses the table 240 to determine whether each received packet (also called a frame) is intended for an accelerated connection. The table 240 may store four-tuples (local IP address, local port number, remote IP address, and remote port number) for all open/active connections. If an open connection in the table 240 has a local port number that is the bound/reserved port number (e.g., 0x333), then the local application acted as a "server" when the accelerated connection was first established. If an open connection in the table 240 has a remote port number that is the bound/reserved port number (e.g., 0x333), then the local application acted as a "client" when the accelerated connection was first established.

If the packet classifier 221 determines that the packet's destination or source port number matches the reserved port number (e.g., 0x333), the packet is for an accelerated connection. The classifier 221 sends the packet to the host bus adapter's accelerated TCP/IP stack 215. If the packet classifier 221 determines that the packet's destination or source port number does not match the reserved port number (e.g., 0x333), the packet is for a non-accelerated connection. The classifier 221 sends the packet to the host TCP/IP stack 312. The classifier 221 may be referred to as a "switch."

Single-Ended TCP/IP Acceleration

A "single-ended" TCP/IP acceleration system uses high-speed/acceleration hardware on either a "client" end or a "server" end (servers 106A-106C in FIG. 1) or on both ends of a connection. In a "single-ended" system, acceleration hardware on both ends is an option. But in a "double-ended" system, acceleration hardware is needed on both ends. In any client-server model, there may be multiple "clients" connecting to the same "server." In a "single-ended" system, some clients may only use slow paths to connect to a server, and some other clients may only use accelerated paths to connect to the server. To distinguish between these connections, the clients should use unique client side port numbers. In the single-ended system, a port number is shared between a slow TCP/IP stack and an accelerated TCP/IP stack. In this case, while processing client side port numbers, the HBA firmware TCP/IP stack at a "server" end should also avoid collision with clients using the slow path.

For example, an accelerated client end may try to establish a connection with a non-accelerated server end. Alternatively, a non-accelerated client end may try to establish a connection with an accelerated server end. The ends may use standard protocols on the wire, such that an accelerated application on one server 106A may communicate with a non-accelerated application on another server 106B.

In a single-ended acceleration system, a host TCP/IP stack 406 (FIG. 4) at a "server" end may share a port number with a firmware TCP/IP stack 215. In this case, two different applications may use the same local port number. One application 310 may use a port number through the accelerated path 414 via the firmware TCP/IP stack 215. The same application 310 or another application may use the same port number through the non-accelerated path 412 via the host TCP/IP stack 406.

In a single-ended TCP/IP acceleration system, a remote site (e.g., server 106B) may not know if a local site connection (e.g., server 106A) is accelerated or non-accelerated. For example, one end of a Virtual Interface software implementation may be accelerated, and the other end of the Virtual Interface software implementation may be non-accelerated.

The above method for double-ended TCP/IP acceleration may not work for single-ended hardware accelerated TCP/IP because (1) a port number of one end (i.e., "server" end) cannot be "fixed" to a specific value and (2) a node agent may not be able to bind to that port number because one or more other applications (e.g., NFS server) may be running on that port.

Client End Solutions

Figure 4:
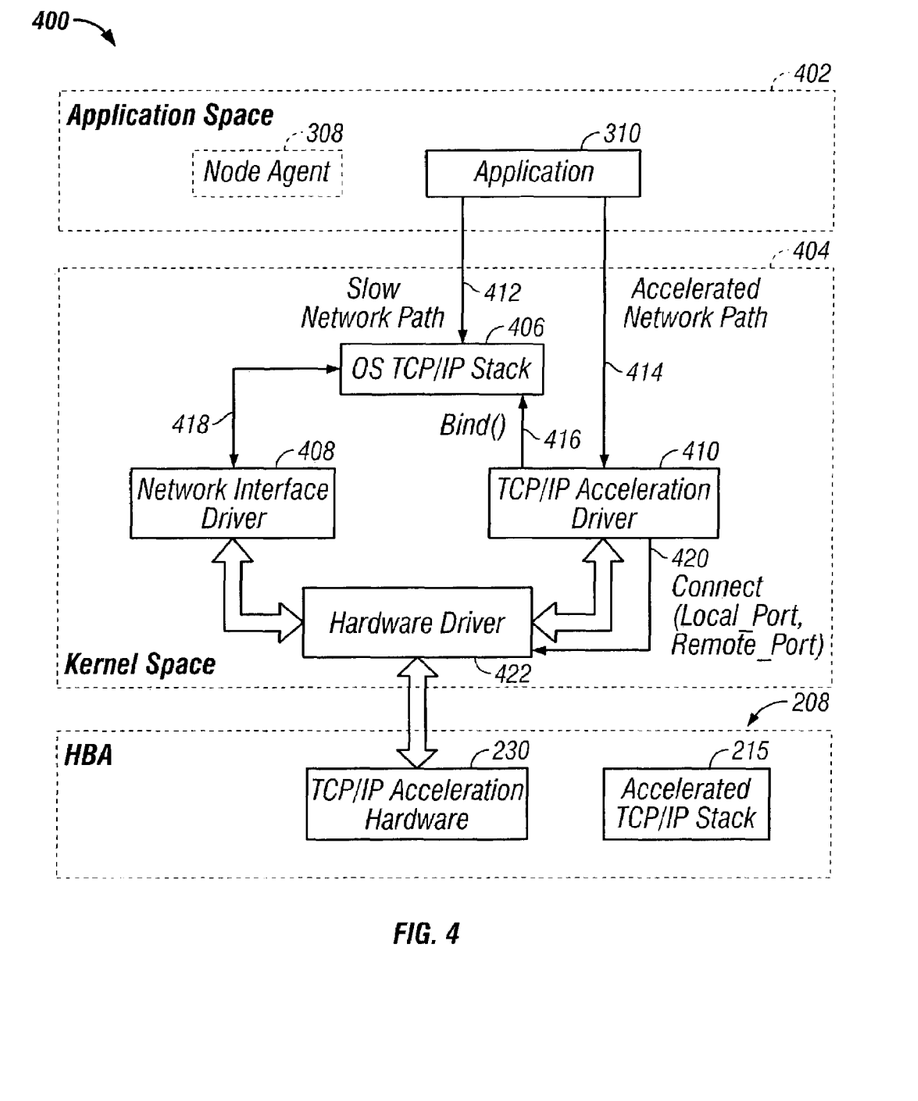
FIG. 4 illustrates a client end of a single-ended Transmission Control Protocol (TCP)/Internet Protocol (IP) acceleration system.

FIG. 4 illustrates a "client" end 400 of a single-ended TCP/IP acceleration ("shared" TCP port) solution. As stated above, a TCP port number may be "shared," i.e., the port number assigned by the acceleration hardware 230 or acceleration driver 410 may also be used by the host TCP stack 406 for a different application. The "client" end 400 initiates a connection. The client end 400 in FIG. 4 has acceleration hardware 230.

When the NAC (Network ACceleration) driver 410 receives a connection request from an application 310, the NAC driver 410 will bind to a TCP port number using a kernel socket API (Application Program Interface) 416 to the host OS TCP/IP stack 406. Alternatively, the NAC driver 410 will bind to a TCP port number with the help of a node agent 308 if the host operating system 400 does not support kernel sockets. The bound port number will prevent the host TCP/IP stack 406 from using that port number.

The NAC driver 410 will then send a command to firmware (hardware driver 422 and host bus adapter accelerated stack 215) to set up a connection with local_port and remote_port using the bound port number as the local port number. The NAC driver 410 may unbind the port when the connection is disconnected.

Figure 5:
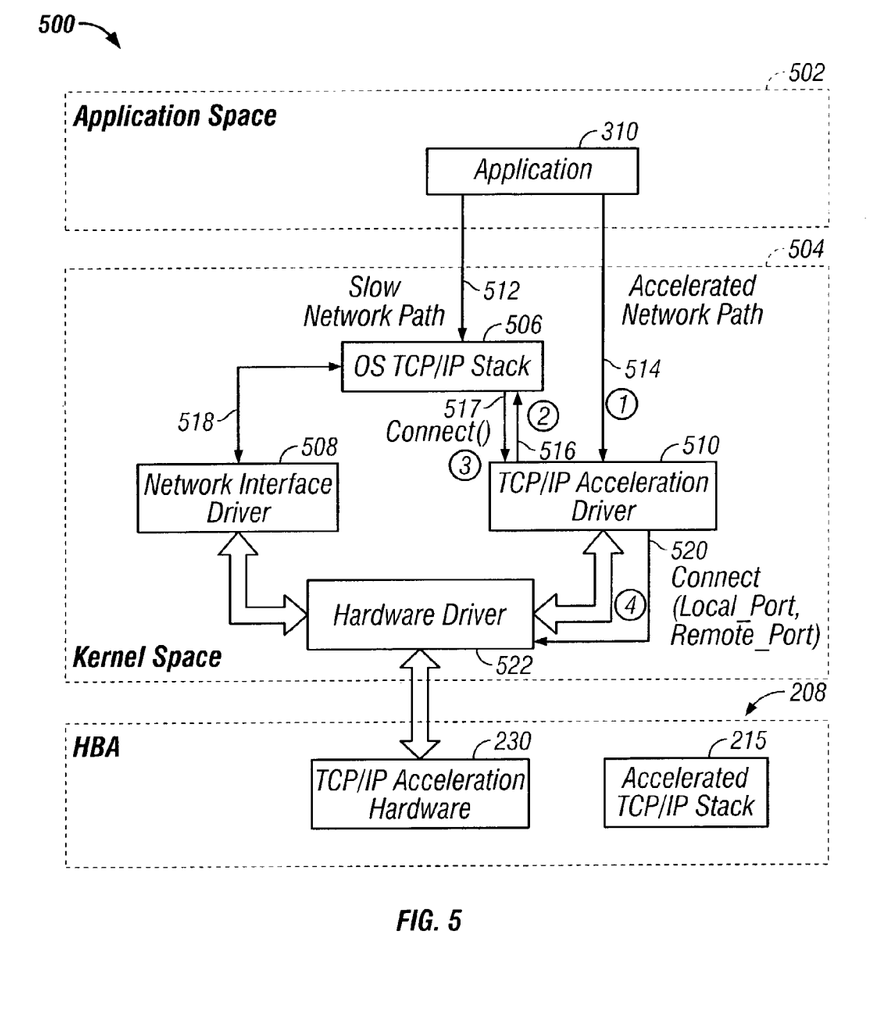
FIG. 5 illustrates a client end of another single-ended acceleration (shared TCP port) system.

FIG. 5 illustrates a client end 500 of another single-ended TCP/IP acceleration (shared TCP port) solution. When the NAC driver 510 receives an accelerated connection request from an application 310 via a line 514, the NAC driver 510 sends the connection request to the non-accelerated host stack 506 via a line 516. The non-accelerated host stack 506 (e.g., in server 106A in FIG. 1) sets up a non-accelerated connection with a remote server 106B (FIG. 1). The host stack 506 confirms the established non-accelerated connection to the NAC driver 510 (e.g., sends an acknowledgement (ACK)) via line 517.

The NAC driver 510 sends the local port number of this connection to the firmware (hardware driver 522 and the host bus adapter accelerated stack 215) via line 520 to "associate" the non-accelerated connection with an accelerated connection. For example, the NAC driver 510 may send a command to create an accelerated connection based on a non-accelerated connection.

The NAC driver 510 may then begin "hijacking" packets for this connection from the hardware driver 522 to transfer on the set-up accelerated connection to the application 310. There may be no bound port number in this solution. The host operating system TCP/IP stack 506 sees the connection as a "quiet" connection since the host operating system TCP/IP stack 506 does not receive packets for the set-up connection. When there is a disconnect, the NAC driver 510 propagates the disconnect to the host TCP/IP stack 506.

FIG. 4 may be simpler to implement, but FIG. 5 may be more efficient in terms of port usage because there is no bound port number.

Server End Solution

Figure 6:
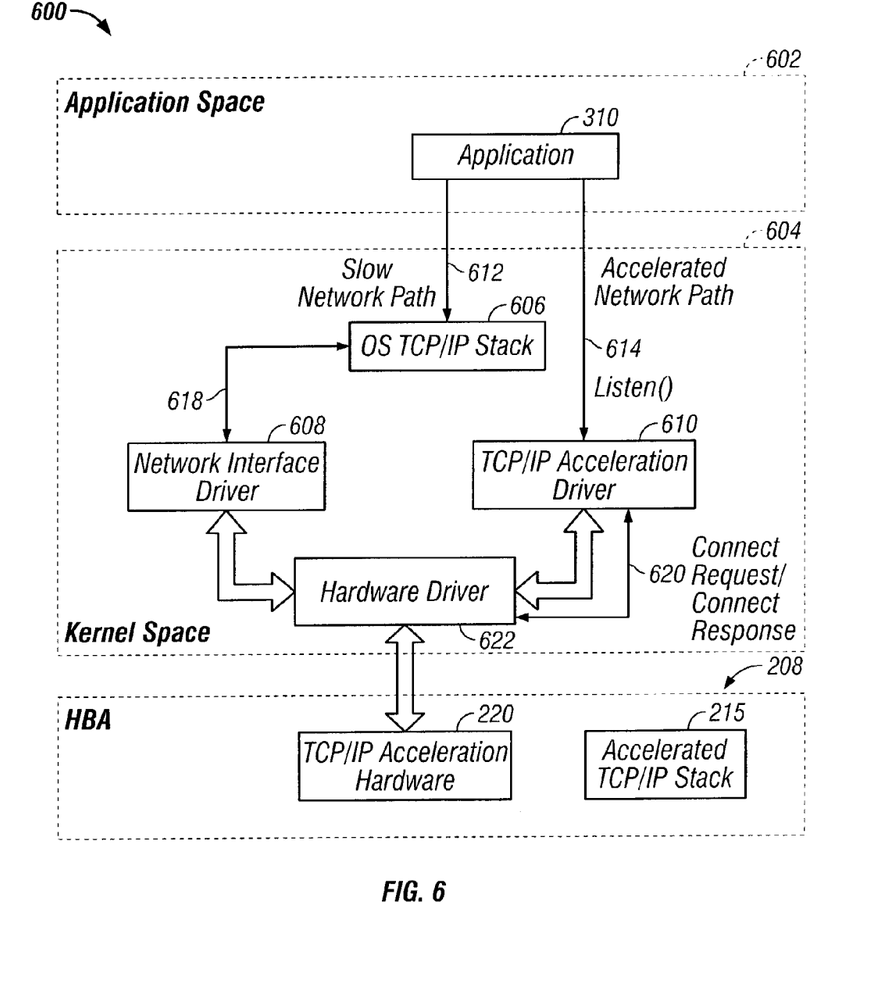
FIG. 6 illustrates a server end of a single-ended TCP/IP acceleration (shared TCP port) system.

FIG. 6 illustrates a "server" end 600 of a single-ended TCP/IP acceleration (shared TCP port) solution. A "client" (e.g., a server 106A in FIG. 1) sends a connection request across the network 108 (FIG. 1) to a "server" end host bus adapter 208 in FIG. 6. The host bus adapter 208 sends the connection request to the NAC driver 610. If there is an application 310 "listening" or monitoring through the NAC driver 610 via line 614, the connection request will get accepted through the accelerated path 614.

If there is no application 310 listening on the port through the NAC driver 610, the driver 610 sends a mismatch response to the hardware driver 622 via line 620, which will pass the incoming connection request to the slow host TCP/IP stack 606.

If there is an application 310 listening on the slow path 612, a non-accelerated connection will get established. If there is no application 310 listening on the slow path 612, a disconnect is sent back to the client (e.g., server 106A in FIG. 1).

TCP and VI/IP are only examples. The system and methods above may be implemented with other Internet Protocol acceleration products, such as TOE TCP Offload Engine. Other embodiments may use User Data Protocol (UDP) over Internet Protocol or Stream Control Transmission Protocol (SCTP) over Internet Protocol. The system and methods described above may be implemented with other protocols with ports that run over Internet Protocol addresses. For example, NFS acceleration may be implemented.

A number of embodiments have been described. Nevertheless, it will be understood that various modifications may be made without departing from the spirit and scope of the application. Accordingly, other embodiments are within the scope of the following claims.

What is claimed is:

1. A method for avoiding port collisions in a hardware-accelerated network protocol in a system comprising a plurality of servers connected to each other through a network, each of the plurality of servers comprising a host operating system, a host bus adapter, a network acceleration driver, a hardware driver in communication with acceleration hardware in the host bus adaptor, and a plurality of ports, said method comprising:

configuring the host operating system to execute a first protocol processing stack;

reserving, by a node agent, at least one of the plurality of ports exclusively for establishing an accelerated network connection for a second protocol processing stack in the host bus adaptor;

configuring the network acceleration driver to communicate with an application via the accelerated network connection; and using one of the ports not reserved for establishing the accelerated network connection for establishing a network connection for the first protocol processing stack to avoid port collisions.

2. The method of claim 1, further comprising using the first protocol processing stack to process Transmission Control/Internet Protocol packets.

3. The method of claim 1, further comprising transmitting a packet of data via the accelerated network connection.

4. The method of claim 1, further comprising transmitting a packet of data via a non-accelerated network connection.

5. The method of claim 1, further comprising maintaining a table of ports for open network connections, the table indicating at least one port matches the reserved port.

6. The method of claim 1, further comprising accessing a table of ports for open network connections to determine if an incoming packet belongs to said accelerated network connection.

7. The method of claim 1, further comprising using a single Internet Protocol address for both an accelerated protocol processing stack and a non-accelerated protocol processing stack.

8. The method of claim 1, further comprising using a single Internet Protocol address for the both the first protocol processing stack in the host and a second protocol processing stack in a host bus adapter.

9. A system for avoiding port collisions in a hardware-accelerated network protocol, said system comprising:

a plurality of servers connected to each other through a network, each of said servers comprising:

a host operating system configured to execute a first protocol processing stack;

a host bus adapter comprising a second protocol processing stack;

a node agent to reserve one of a plurality of ports exclusively for establishing an accelerated network connection for the second protocol processing stack;

a network acceleration driver coupled to the first protocol processing stack, said network accelerate driver configured to communicate with an application via the accelerated network connection; and a hardware driver in communication with acceleration hardware in the host bus adapter, wherein at least one of the ports not reserved for establishing the accelerated network connection for the second protocol processing stack is used for establishing a non-accelerated network connection for the first protocol processing stack to avoid port collisions.

10. The system of claim 9, wherein at least two of the plurality of servers can form a double-ended acceleration connection.

11. A server connected to at least another server, each of the servers comprising a host operating system, a host bus adapter, a network acceleration driver, a hardware driver in communication with acceleration hardware in the host bus adaptor, and a plurality of ports, said server comprising:

a host operating system configured to execute a first protocol processing stack;

a host bus adapter comprising a second protocol processing stack;

a plurality of ports;

a network acceleration driver coupled to the first protocol processing stack; and a hardware driver in communication with acceleration hardware in the host bus adapter, a node agent to reserve one of a plurality of ports exclusively for establishing an accelerated network connection for the second protocol processing stack, and one of the ports not reserved for establishing the accelerated network connection for the second protocol processing stack is used for establishing a non-accelerated network connection for the first protocol processing stack to avoid port collisions, and wherein said network accelerate driver is configured to communicate with an application via the accelerated network connection.

12. The server of claim 11, wherein the node agent is further configured to inform the second protocol processing stack of the reserved port.

13. The server of claim 11, further comprising a network interface driver coupled to the first protocol processing stack.

14. The server of claim 11, wherein the host bus adapter further comprises a packet classifier.

15. The server of claim 11, wherein the host bus adapter further comprises a table of ports for open network connections, the table indicating at least one port reserved for the accelerated network connection.

16. A host operating system of a server for avoiding port collisions in a hardware-accelerated network protocol, the server connected to another server through a network, each of the servers comprising a host operating system, a host bus adapter, a network acceleration driver, a hardware driver in communication with acceleration hardware in the host bus adaptor, and a plurality of ports said host operating system comprising:

a first protocol processing stack configured to process TCP/IP packets such that a non-accelerated network connection is established between the first protocol processing stack and a software application using one of a plurality of ports that are not reserved exclusively for establishing an accelerated network connection for a second protocol processing stack in a host bus adapter to avoid port collisions;

a network interface driver;

a network acceleration driver; and a hardware driver in communication with acceleration hardware in the host bus adapter, wherein the first protocol processing stack is coupled to the network acceleration driver configured to communicate with the application via the accelerated network connection, and at least one of the plurality of ports is exclusively reserved by a node agent for establishing an accelerated network connection for the second protocol processing stack in the host bus adaptor.

17. The operating system of claim 16, further comprising a node agent configured for binding a port for the second protocol processing stack.

18. A computer-readable storage medium storing program code for avoiding port collisions in a hardware-accelerated network protocol in a system comprising a plurality of servers connected through a network, each of the servers comprising a host operating system, a host bus adapter, a network acceleration driver, a hardware driver in communication with acceleration hardware in the host bus adaptor, and a plurality of ports, said program code when executed, performing the steps of:

configuring the host operating system of one of the servers to execute a first protocol processing stack;

reserving, by a node agent of the one of the servers, at least one of the plurality of ports of the one of the servers exclusively for establishing an accelerated network connection for a second protocol processing stack in the host bus adaptor of the one of the servers;

configuring the network acceleration driver of the one of the servers to communicate with an application via the accelerated network connection; and using one of the ports of the one of the servers not reserved for establishing the accelerated network connection for establishing a network connection for the first protocol processing stack of the one of the servers to avoid port collisions.

* * * * *